United States Patent
Bender

(10) Patent No.: US 8,082,654 B2
(45) Date of Patent: Dec. 27, 2011

(54) PRODUCTION METHOD FOR LARGE ROTOR/STATOR LAMINATIONS

(75) Inventor: Mark Bender, Algonquin, IL (US)

(73) Assignee: Tempel Steel Company, Chicago, IL (US)

( * ) Notice: Subject to any disclaimer, the term of this patent is extended or adjusted under 35 U.S.C. 154(b) by 288 days.

(21) Appl. No.: 12/506,298

(22) Filed: Jul. 21, 2009

(65) Prior Publication Data

US 2011/0016701 A1    Jan. 27, 2011

(51) Int. Cl.
*H02K 15/02*    (2006.01)
(52) U.S. Cl. .................... 29/596; 29/598; 310/216.004
(58) Field of Classification Search .................. 29/596, 29/598; 310/216.004
See application file for complete search history.

(56) References Cited

FOREIGN PATENT DOCUMENTS

GB    2228145 A    *    8/1990

* cited by examiner

*Primary Examiner* — Livius R Cazan
(74) *Attorney, Agent, or Firm* — Schiff Hardin LLP

(57) ABSTRACT

In a method for manufacturing a lamination for a motor or generator where a plurality of the laminations are used to form a core of the motor or generator, a material strip of electrical steel is provided having a width substantially corresponding to half of an outer diameter of the lamination to be created. Slant cuts are made along the material strip to form trapezoids of substantially a same area. Two of the trapezoids are joined together along a side edge of each to form a hexagon. The lamination is then stamped from the hexagon.

9 Claims, 3 Drawing Sheets

64.961"

PRODUCTION METHOD FOR LARGE ROTOR/STATOR LAMINATIONS

BACKGROUND

According to the prior art, electrical steel in coil form is available in widths up to 48 inches. Motor or generator cores have a stator and a rotor, each formed from a plurality of stacked laminations referred to also herein as lamination layers. Coil form widths of up to 48 inches allows for stator production in a complete round form up to that size. For larger stators, like those typically seen in large generator or motor applications, each of the lamination layers of the stator must be produced in an arc segment form with typically 6 or 8 lamination segments 10 (FIG. 1) making up the complete stator lamination layer.

Currently the following prior art process steps are known for a segmented stator lamination layer (see FIG. 1 for one of the segments).

As shown in FIG. 1, material is slit to form a strip 61 having a width 11 required based on part and die designs. For this example, the material strip width 11 is 32.875 inches which is a segment width 9 of 32.480 inches plus 0.1975 inches in each scrap web 8A, 8B, and has an arc angle 12 of 60°.

Stator lamination segments 10 are produced in either a progressive or compound die that is mounted in a punch press. The material progression distance 7 as shown in FIG. 1 required to produce each part in this example is 13.050 inches. Note the overlap because of the bottom curved edge on segment 10 and upper curved edge on subsequent segment 10A. Total material required to produce one lamination layer of six stator lamination segments is 32.875 inches×13.050 inches×6=2574 square inches.

The six stator lamination segments 10 are assembled into a stator core by placing the six lamination segments 10 per laminate layer in a circular pattern on an assembly fixture. Each subsequent layer of lamination segments is rotated 30 degrees to offset the split lines between the lamination segments in each lamination layer.

The assembled stator core is fused together via welding. Some designs may also use tie rods and/or a combination of tie rods and welding to fuse the core.

For a first option for making a rotor lamination according to the prior art, the following steps are provided.

Material 13 is slit to a width 5 required based on the part and die designs (see FIG. 2). For this example the material width 5 is 40.530 inches as shown in FIG. 2, which is the rotor width 4 of 40.157 inches plus a scrap width at 3A, 3B of 0.1865 inches each.

Rotor blanks (see FIG. 4) are produced in a compound die which finishes the ID 14 and the OD 27 of the part. The material progression 28 required to produce each part in this example is 40.350 inches, which is the rotor width of 40.157 inches plus a 0.0965 inch scrap width for each scrap segment 29A, 29B. Total material required to produce one rotor lamination is 40.530 inches×40.350 inches=1635 square inches.

The rotor slots 15 as shown in FIG. 5 are then added to the rotor blank. This can be done in a notching press with a notching die which produces 1-2 slots per stroke while indexing the lamination on their central axis. A single stroke press of higher tonnage capacity can also be used to punch all of the slots at once with a die produced for this press. In both cases the laminations are generally manually loaded into the machine, although this process can be automated.

The rotor core is assembled on an assembly mandrel and locked together with a process similar to that used in stator assembly.

Steps for making a rotor lamination according to a second option according to the prior art are as follows.

Material is slit to the width required based on the part and die designs. For this example the material width 5 is 40.530 inches as shown in FIG. 2, which is the rotor width 4 of 40.157 inches plus 0.1865 inches scrap for each scrap web 3A, 3B.

Slit material 13 is sheared to a length of 40.530 inches (slightly larger than what is shown in FIG. 2) producing a square of that size. Total material required to produce one rotor lamination for this second option is thus 40.530 inches× 40.530 inches=1643 square inches.

The ID 14 of the rotor is punched in a manually fed single hit operation as shown in FIG. 2.

The square blank for the second option with punched ID is loaded into a circle shear to produce a round blank of a slightly larger OD 30 of 40.3 inches as shown in FIG. 3 than the diameter 31 of 40.157 inches of the finished rotor as shown in FIG. 4.

The rotor slots 15 are added in the same manner as described in the first option process. The rotor OD 30 is also trimmed to a final size 31 of 40.157 inches in this operation (see prior art FIG. 4).

Rotor cores are assembled on an assembly mandrel and locked together with a process similar to the process used in stator assembly.

Total material usage for the above processes are 4209 square inches and 4217 square inches respectively dependent on which rotor process option one or option two is used. Subtle variations in the above processes are likely to exist but they would have little or no impact on the overall material usage.

SUMMARY

It is an object to provide an improved method for manufacturing large rotor/stator laminations which reduces material scrap and improves quality of the rotor/stator lamination.

In a method for manufacturing a lamination for a motor or generator where a plurality of said laminations are used to form a core of the motor or generator, a material strip of electrical steel is provided having a width substantially corresponding to half of an outer diameter of the lamination to be created. Slant cuts are made along the material strip to form trapezoids of substantially a same area. Two of the trapezoids are joined together along a side edge of each to form a hexagon. The lamination is then stamped from the hexagon.

DESCRIPTION OF THE PREFERRED EMBODIMENT

Figure 1:
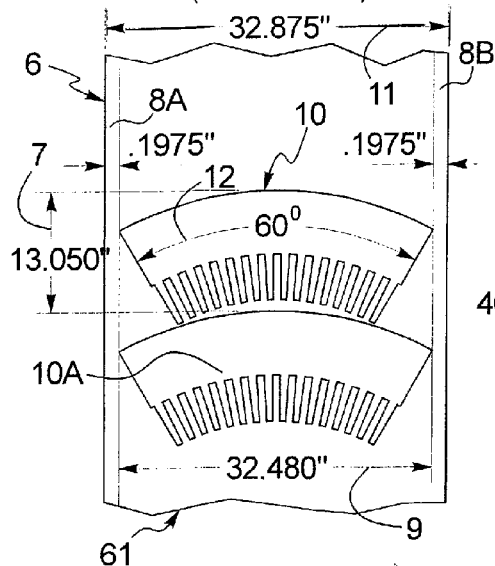
FIG. 1 illustrates one of six stator lamination segments used in the prior art to create a single lamination layer.
Figure 2:
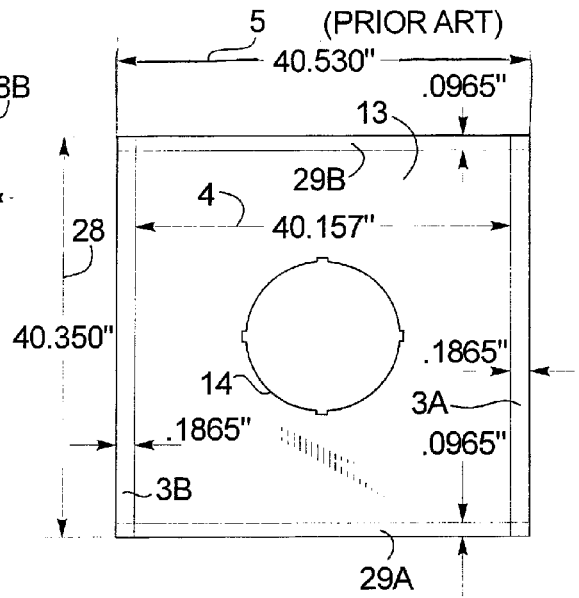
FIG. 2 shows material slit to a width required to make a rotor according to the prior art.
Figure 3:
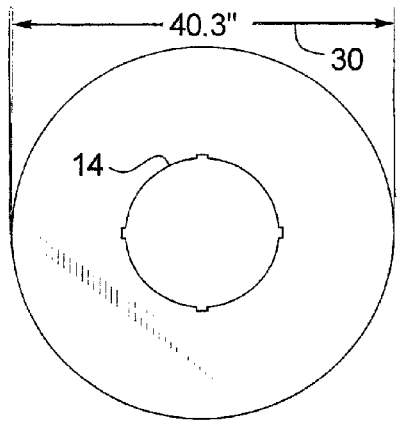
FIG. 3 shows a prior art rotor blanked from the strip of FIG. 2 but with a slightly larger diameter than the finished rotor according to a second option.
Figure 4:
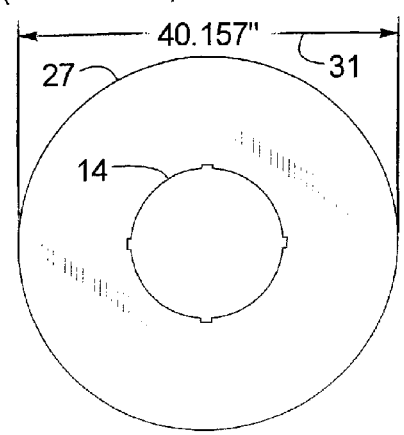
FIG. 4 shows a rotor blank in a first option for making a rotor lamination according to the prior art.
Figure 5:
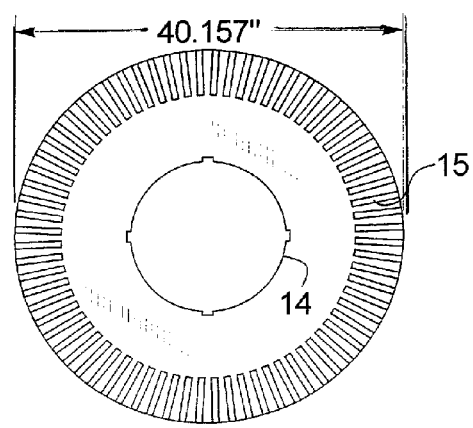
FIG. 5 shows a prior art rotor lamination manufactured from the steps shown in FIGS. 2, 3, and 4.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

Figure 6:
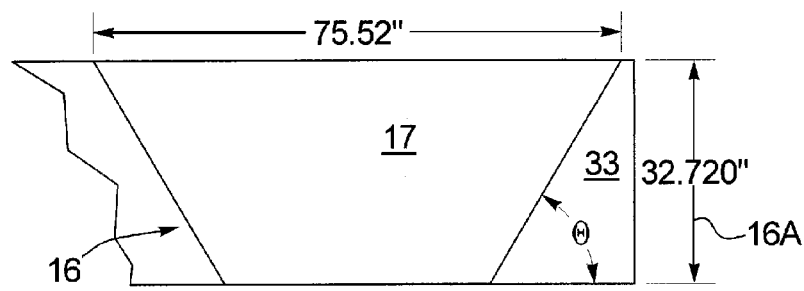
FIG. 6 shows, according to the preferred embodiment, a slit material strip which is sheared to form a first trapezoid used with a second trapezoid for making a stator and rotor laminations according to the preferred embodiment.
Figure 10:
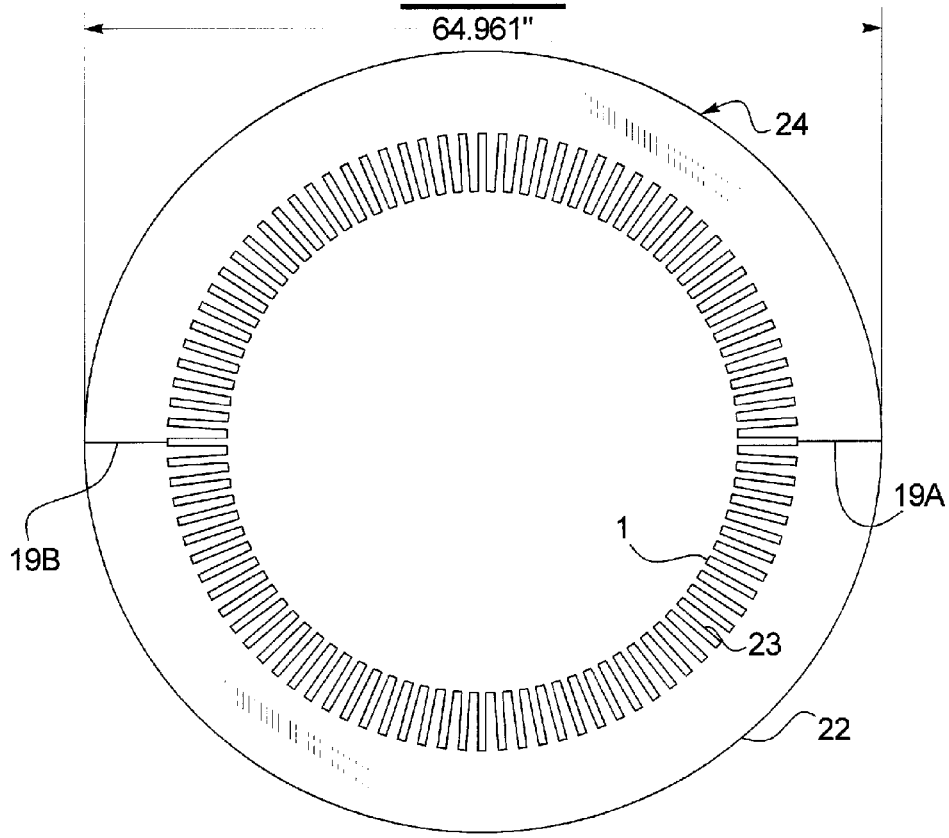
FIG. 10 shows the stator manufactured from the hexagon shape shown in FIG. 8 according to the preferred embodiment.

The material is slit, as shown in FIG. 6, to form a strip 16 having a width 16A equal to a dimension slightly greater than half of an OD of the stator part 24 shown in FIG. 10 being made. For this example the material width 16A is 32.720 inches. At a beginning of the strip a first trapezoid 17 with adjacent initial scrap piece 33 is shown.

Figure 7:
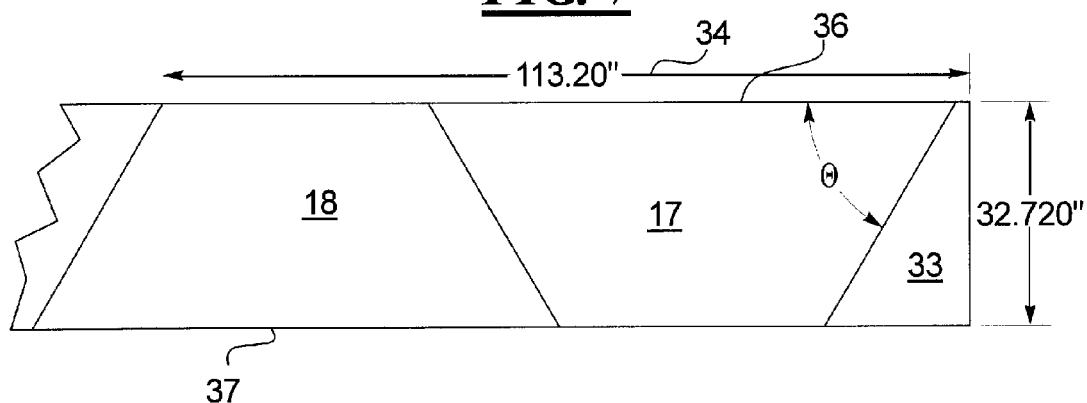
FIG. 7 shows a slit material strip sheared into two equal trapezoid shapes to make the stator and rotor laminations according to the preferred embodiment.

Slit material 16 is sheared into two equal trapezoid shapes 17, 18 (see FIG. 7) with a tool defining both opposing sides of the trapezoid. The progression of the material is equal to the combined length of the parallel sides of the two oppositely facing trapezoids. For this example the material progression 34 is 113.20 inches.

Figure 8:
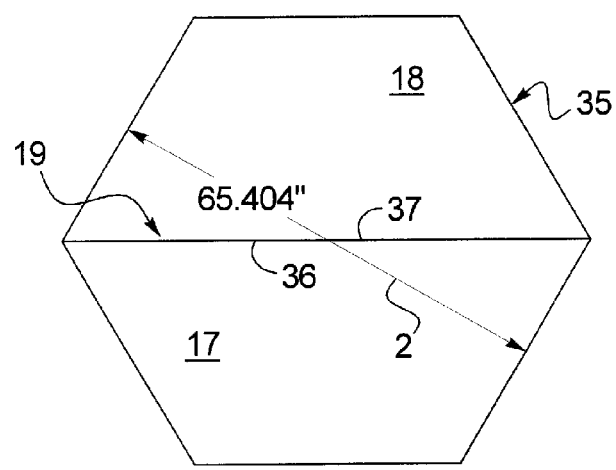
FIG. 8 shows the trapezoids welded together to make a hexagon for use in making the stator and rotor laminations according to the preferred embodiment.

The trapezoids 17, 18 are welded together at weld seam 19 along the longest sides to produce a hexagon 35 (see FIG. 8). It may be required to shear a small amount of material off of these edges to make them perfectly straight for the welding process. A distance 2 from one face to an opposite face of the hexagon is 65.404 inches.

Figure 9:
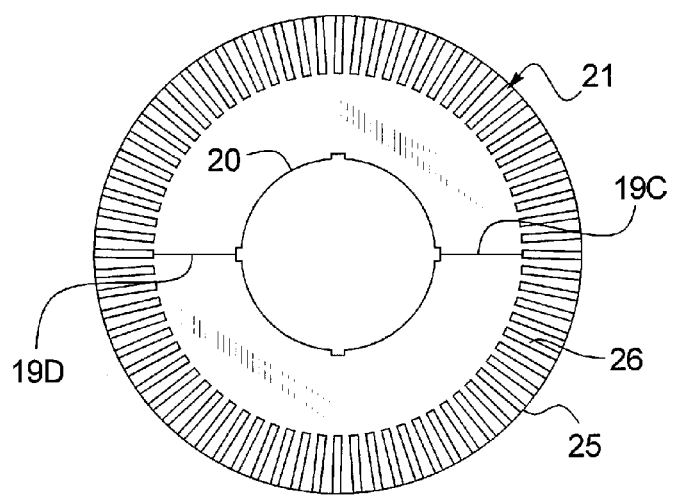
FIG. 9 shows the rotor manufactured from the hexagon shape shown in FIG. 8 according to the preferred embodiment.

The ID 20 of the rotor 21 is punched in a manually fed single hit operation (FIG. 9).

The ID 1, OD 22, and slots 23 of the stator 24 are finished in a notching press equipped with a suitable notching die (FIG. 10).

The OD 25 and slots 26 of the remaining rotor 21 blank are punched in a notching press with a suitable notching die (FIG. 9).

Weld seam portions 19A, B, C, D which are parts of weld seam 19 shown in FIG. 8 can be observed in FIGS. 9 and 10.

The stator laminations 24 are stacked around an assembly arbor rotating each lamination a set number of degrees to offset any material thickness variations and the welded seams.

The stator is fused together with the same methods used in the known prior art for fusing.

The rotor is assembled from rotor laminations 21 and fused together with the same methods used in the known prior art.

An alternate manufacturing process using single hit dies to punch the individual part features, commonly called gang slotting, can also be used with the welded hexagons to produce the finished rotor and stator.

Total material used for the example in the process of the preferred embodiment is 32.720 inches (width 20)×113.200 inches (progression 34)=3704 square inches. This equates to a 12% reduction in total material usage as compared to prior art techniques.

In FIG. 6 the angle Θ is preferred to be 60°, but any angle less than 90° may be used. 60° is best use of material.

Using a single lamination with only two segments according to the preferred embodiment described above in place of three or more segments, and use of the hexagon 35 shown in FIG. 8, has several advantages:

assembly of the three or more segment laminations requires significantly more labor than it does to assemble full round single piece laminations;

the complexity of the fixture required to assembly the stator core is greatly reduced as the ID and OD of the stator are now determined by the lamination, not the fixture they are assembled on;

the resulting split lines between the three or more stator arc segments also result in lower generator or motor performance compared to the two segments welded single piece lamination design of the preferred embodiment— this may make it possible to use fewer laminations and achieve the same output; and overall material usage to produce a complete rotor/stator set can be reduced by as much as 12% with the method of the preferred embodiment described above.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

I claim as my invention:

1. A method for manufacturing a lamination for a motor or generator where a plurality of said laminations are used to form a core of a stator, a rotor, or both a stator and a rotor of the motor or generator, comprising the steps of:

providing a material strip of electrical steel having a width substantially corresponding to half of an outer diameter of the lamination to be created;

making slant cuts along the material strip to form oppositely facing trapezoids of substantially a same area;

joining two of the trapezoids together along a side edge of each to form a hexagon; and stamping the lamination from the hexagon.

2. The method of claim 1 wherein the lamination comprises a stator lamination, an inside of the stator lamination is stamped out to create an inside diameter, and slots are stamped out at the inside diameter.

3. The method of claim 2 wherein material stamped out to create the inside diameter of the stator lamination is used to create a rotor lamination having an outside diameter substantially the same as the stator lamination inside diameter, an inside diameter of the rotor lamination is stamped out, and slots are stamped out at an outside diameter of the rotor lamination.

4. The method of claim 1 wherein the slant cuts which are adjacent and successive are non-parallel.

5. The method of claim 1 wherein a slant angle of one of the slant cuts is substantially 60° and a slant angle of a directly succeeding slant cut is substantially 120°, the slant angles being measured with respect to a side edge of the material strip.

6. The method of claim 1 wherein the two trapezoids are joined together by a weld seam.

7. The method of claim 1 wherein said material strip width is slightly greater than said half of said outer diameter.

8. A method for manufacturing a lamination for a motor or generator where a plurality of said laminations are used to form a core of the motor or generator, comprising the steps of:
 providing a material strip of electrical steel having a width substantially corresponding to half of an outer diameter of the lamination to be created;
 making slant cuts along the material strip to form trapezoids of a substantially same area;
 joining two of the trapezoids together along a side edge of each to form a hexagon; and
 stamping the lamination from the hexagon.

9. The method of claim 8 wherein said material strip width is slightly greater than said half of said outer diameter.

* * * * *